United States Patent
Hall et al.

(10) Patent No.: US 10,395,172 B2
(45) Date of Patent: Aug. 27, 2019

(54) COLLABORATIVE DECISION MAKING

(71) Applicant: AIRBUSGROUP LIMITED, London (GB)

(72) Inventors: Mark Hall, Cardiff (GB); Kevin Jones, Cardiff (GB); Simon Gould, Tredegar (GB); Patrick Geoff Williams, Wiltshire (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 1214 days.

(21) Appl. No.: 14/049,881

(22) Filed: Oct. 9, 2013

(65) Prior Publication Data
US 2014/0101088 A1  Apr. 10, 2014

(30) Foreign Application Priority Data
Oct. 10, 2012 (GB) .................................. 1218116.0

(51) Int. Cl.
*G06F 17/00* (2019.01)
*G06N 5/02* (2006.01)
(Continued)

(52) U.S. Cl.
CPC ............. *G06N 5/02* (2013.01); *G06Q 10/101* (2013.01); *G06Q 10/103* (2013.01); *G06N 5/003* (2013.01);
(Continued)

(58) Field of Classification Search
CPC .......... G06N 5/04; G06N 99/005; G06N 5/02; G06N 20/00; G06N 5/003; G06Q 10/101; G06Q 10/103; G06Q 30/02; G09B 29/00
See application file for complete search history.

(56) References Cited

U.S. PATENT DOCUMENTS

| | | | | |
|---|---|---|---|---|
| 6,215,498 B1 * | 4/2001 | Filo | ...................... | G06F 3/011 345/419 |
| 7,647,288 B2 * | 1/2010 | Friedlander | .............. | G06N 7/08 706/47 |

(Continued)

FOREIGN PATENT DOCUMENTS

EP  19933525 A1  6/2008

OTHER PUBLICATIONS

European Patent Office, Search Report dated Apr. 9, 2015 in European Application No. 13187829.

*Primary Examiner* — Scott A. Waldron
*Assistant Examiner* — Ababacar Seck
(74) *Attorney, Agent, or Firm* — Nixon & Vanderhye P.C.

(57) ABSTRACT

A computer implemented method of generating decision options. Sensor data is received from a plurality of sensors and presented visually to two or more users. Those users can then analyze the images and enter tag data which is received and stored along with the sensor data. The sensor and tag data are then input to a computer implemented decision support algorithm along with a stored operational plan. The algorithm then outputs one or more decision options which can assist a human decision maker in making a decision. The invention enables such a decision maker to make a decision quickly which complies with a previously stored operational plan and is likely to be correct since it is based on inputs from multiple human users. The invention is capable of being easily scaled to deal with a high volume of sensor data and a large number of users.

6 Claims, 2 Drawing Sheets

(51) Int. Cl.
*G06Q 10/10* (2012.01)
*G06N 5/00* (2006.01)
*G06N 5/04* (2006.01)
*G06Q 30/02* (2012.01)
*G06N 20/00* (2019.01)
*G09B 29/00* (2006.01)

(52) U.S. Cl.
CPC .............. *G06N 5/04* (2013.01); *G06N 20/00* (2019.01); *G06Q 30/02* (2013.01); *G09B 29/00* (2013.01)

(56) References Cited

U.S. PATENT DOCUMENTS

| | | | |
|---|---|---|---|
| 2003/0144868 A1* | 7/2003 | MacIntyre | G06F 17/30536 705/7.38 |
| 2011/0134204 A1* | 6/2011 | Rodriguez | G06Q 10/10 348/14.03 |
| 2013/0185291 A1* | 7/2013 | Tyndall | G06F 17/30598 707/723 |

* cited by examiner

COLLABORATIVE DECISION MAKING

RELATED APPLICATIONS

The present application is based on, and claims priority from, British Application No. 2012-1218116.0, filed Oct. 10, 2012, the disclosure of which is hereby incorporated by reference herein in its entirety.

FIELD OF THE INVENTION

The present invention relates to a computer-implemented method of generating decision options, and a computer system programmed to perform such a method.

BACKGROUND OF THE INVENTION

A known collaborative communication method is described in EP-A1-1933525. A plurality of client devices are represented as an avatar in a central virtual reality environment. Data objects are received from the client devices and displayed in the virtual reality environment.

A virtual command post is described in U.S. Pat. No. 6,215,498. A networked computer system creates a virtual work environment wherein participants can work in parallel to create simultaneous sets of solutions to problems outside the virtual work environment.

SUMMARY OF THE INVENTION

A first aspect of the invention provides a method of generating decision options as set out below in claim 1. Sensor data is received from a plurality of sensors and presented visually to two or more users. Those users can then analyse the images and enter tag data which is received and stored along with the sensor data. The sensor and tag data are input to a computer implemented decision support algorithm along with a stored operational plan. The algorithm then outputs one or more decision options which can assist a human decision maker in making a decision. The options may be output visually, in audio or by a combination of both. The present invention enables such a decision maker to make a decision quickly which complies with a previously stored operational plan and is based on inputs from multiple human users. The invention is capable of being easily scaled to deal with a high volume of sensor data and a large number of users.

The sensor data is typically tagged or annotated with the tag data, which may be metadata or other meaningful information putting the sensor data in context. Typically the tag data is "data aware" in that it is tied to the underlying sensor data rather than being a freeform graphical annotation.

The decision options generated by the decision support algorithm are typically output to a decision maker who may be the first or second user or a different person. The stored operational plan may be updated in accordance with the selection from the decision maker.

Preferably a tag visualisation view is generated from at least some of the sensor data, at least some of the first tag data, and at least some of the second tag data. This tag visualisation view can then be presented to a tag visualiser who may be the first or second user, the decision maker, or a different person. The tag visualiser can then input third tag data in response to the presentation of the tag visualisation view, and that third tag data input into the decision support algorithm. This enables multiple users to work collaboratively on a problem, each viewing tag data from the other users.

Unlike in U.S. Pat. No. 6,215,498, where all participants view the same map at the same time, the visualisations may be presented to the first and second users at different times. By storing (and optionally displaying) tag data from multiple users, the present invention enables the process to operate in such an asynchronous manner.

Optionally the visualisation presented to the second human user is different to the visualisation presented to the first user, and the different visualisations presented to the first and second human users may be based on different subsets of the data.

A second aspect of the invention provides a computer system programmed to perform the method of the first aspect of the invention. A sensor data store is provided for storing sensor data from the sensors. A tag data store is also provided, which may be the same store as the sensor data store or a different store. A visualisation server is programmed to generate one or more visualisations of at least some of the sensor data. One or more output devices are provided for displaying the visualisation(s) to the first and second user. One or more input devices (which may be the same as the output devices) are provided for receiving tag data from the first and second users. A decision support server is programmed to run a decision support algorithm which generates decision options in accordance with the first and second tag data, a stored operational plan, and at least some of the sensor data. An output device is arranged to output the decision options generated by the decision support algorithm. This output device may be the same device which displays the visualisation(s) to the first and second user, or a different device.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
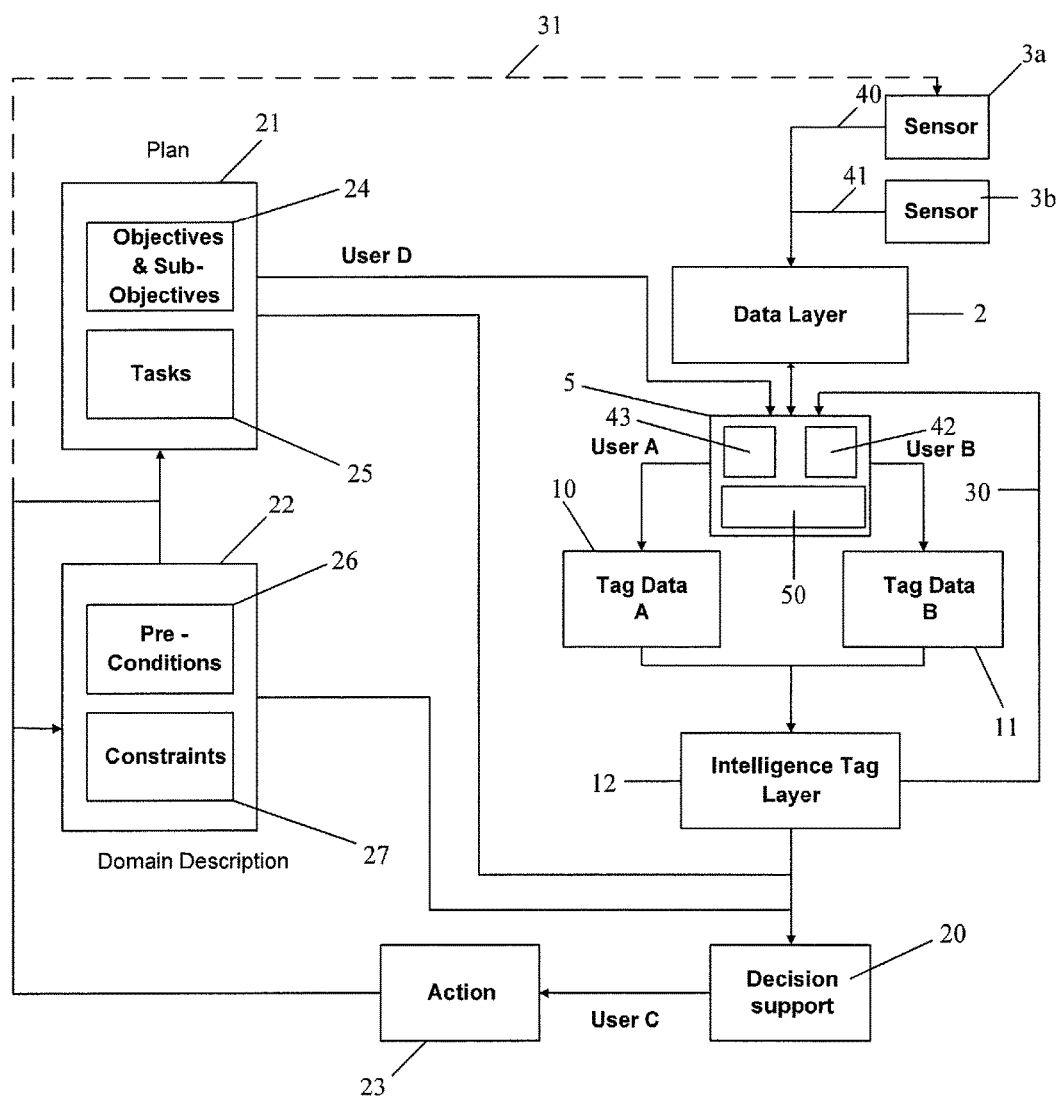
FIG. 1 is a process flow diagram showing a method of collaborative decision making.
Figure 2:
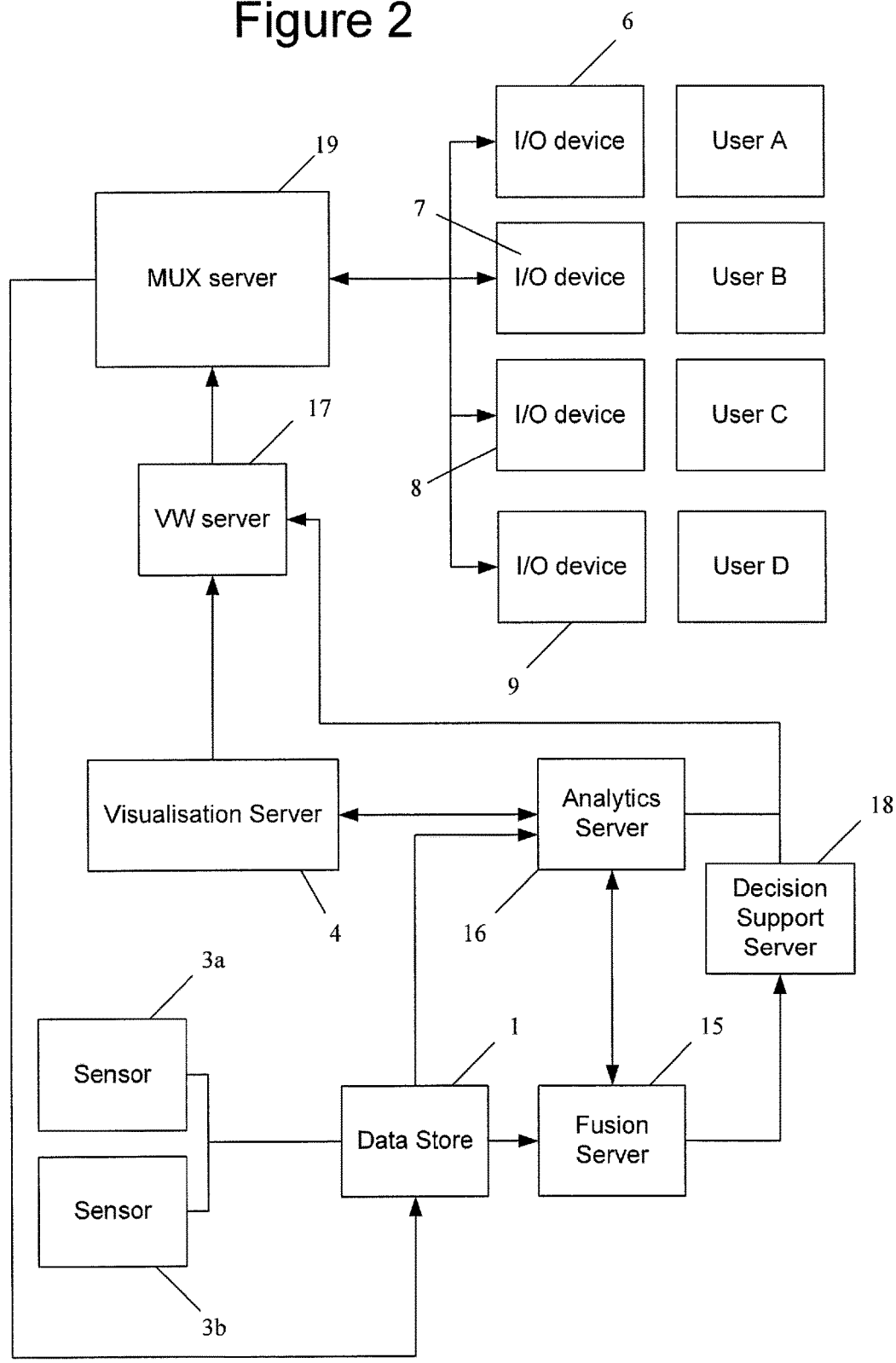
FIG. 2 shows a computer system programmed to perform the method of FIG. 1.

A computer assisted method of collaborative decision making is illustrated in FIG. 1 and implemented on the computer system of FIG. 2. A data store 1 receives and stores sensor data from a plurality of sensors 3a,b in a data layer 2. The sensors may monitor events on a computer network, or natural disasters for example. A visualisation server 4 generates a visualisation 5 of at least some of the sensor data and presents it to a first human user (User A) as an image via a multiplexer (MUX) server 19 and first input/output device 6 and to a second human user (User B) as an image via MUX server 19 and a second input/output device 7.

Each user can be displayed the same image, or they may request different images which are based on different subsets of the sensor data and/or different ways of visualising the same sensor data. Hence the visualisation of the sensor data is an interactive process which each user can control independently via their respective I/O device 6, 7. For instance a user may view a map displaying data acquired over a geographical area, and then zoom in to a small part of that map to view the sensor data in more detail. The user may also apply a filter to the displayed image.

The sensor data may be displayed in its raw form, or sensor data from the different sensors may be fused by a fusion server 15 and/or analysed by an analytics server 16 before being displayed. Fusion of data from different sensors may involve for example representing multiple sets of sensor data on a single screen.

The visualisations may be presented to the users at different times (asynchronously) or at the same time (synchronously). Although each user is described as having their own respective I/O device 6, 7 they may share a single I/O device instead. A virtual world (VW) server 17 provides a virtual collaborative environment where the users are geographically dispersed, but all connected via a 3D persistent "virtual world" in which each user is represented as an avatar.

In response to the presentation of the visualisation, the users each input tag data 10,11 into their respective I/O device. The MUX server 19 receives the tag data 10,11 from the devices 6,7 and stores it in an intelligence tag layer 12 on store 1. Each item of tag data 10, 11 is associated with an associated subset of the sensor data in the data layer 2. That is, the tags in the tag layer 12 are mapped directly to related data points in the data layer 2, augmenting the data in the data layer with derived insight from the users.

An autonomous decision support algorithm 20 running on server 18 then generates decision options in accordance with at least some of the tag data 10,11 in the intelligence tag layer 12, at least some of the sensor data in the intelligence tag layer 12, and an operational plan 21 and domain description 22 in the data store 1.

The tag data 10,11 is in a pre-defined format which is understood by the decision support algorithm 20. The operational plan 21 consists of a set of objectives 24 and tasks 25. The tasks are output to a User D via an I/O device 9 shown in FIG. 2. The objectives 24 include high-level objectives (such as "keep network service operational") and lower level sub-objectives (such as "ensure throughput levels are maintained >80% for all network availability", or "ensure non-authorised access to the system is prohibited"). The tasks 25 are specific actions (both abstract actions and ground actions) required to achieve the objectives 24. The domain description 22 consists of pre-conditions 26 (for example "all attacks should be monitored for intelligence purposes") and constraints 27 (for instance "subnets that provide major services cannot be disconnected").

The decision options generated by the autonomous decision support algorithm are output to a human decision maker (User C) via an input/output device 8. The decision maker decides on an action 23 based on the options 20 presented to him, and enters that action into their I/O device. The action 23 may be simply a selection of one of the options, or some other action. The action 23 is then used to update the stored operational plan 21 and/or domain description 22 in accordance with the selection from the decision maker.

As illustrated by feedback connection 30, the intelligence tag layer 30 provides an input into the visualisation 5, which input can be used to add tags to the image(s) displayed to the users A,B in accordance with the tag data 10,11. This may prompt the users to add further tag data via their respective I/O devices 6,7 which further tag data can be added to the intelligence tag layer 12 and input into the autonomous decision support algorithm. This enables the process to proceed in an iterative and collaborative manner.

A specific example of operation of the method of FIG. 1 will now be described. In this example one of the sensors 3a generates Intrusion Detection System (IDS) alerts 40 from a computer network (not shown) and the other sensor 3b generates network traffic log data 41 for that computer network. The plan 21 includes objectives 24 which include keeping network service operation and protecting confidentiality of data. When an IDS alert 40 is generated, User A is presented with an IDS alert image 43 which alerts User A to a potential malware infection which could be detrimental to the computer network being monitored by the IDS sensor 3a. The User A analyses the IDS alert image 43 and generates tag data 10 which gives insight into the importance and potential type of malware, along with a timestamp indicating the time of the alert 40.

As mentioned above, the tags in the tag layer 12 are mapped directly to related data points in the data layer 2, augmenting the data in the data layer with derived insight from the users. In this example if a given subset of data points in the data layer 2 represent IDS alerts, the insight is recorded (that is, "tagged") by the User A, saying that the data suggests that a certain attack has occurred, which links directly to the subset of data points for provenance.

At the same time the User B is presented with a heatmap 42 in which the network traffic log data 41 is represented graphically in an easy to understand way. This heatmap 42 is updated regularly so the User B may notice some abnormal connections from a number of computers in the network. Thus the User B analyses the heatmap 42 and generates tag data 11 which notes the abnormal connections, along with a timestamp.

The visualisation server 4 then generates a shared tag visualisation view 50 which may be for example a heatmap annotated in accordance with the tag data 10,11. The users A and B can then work collaboratively to add even further tag data in response to the presentation of the tag visualisation view. For instance they may work together to confirm that the IDS alert 40 is not a false positive. Communication between the users may be verbal (face-to-face or via an audio or video remote connection) and/or by text.

The decision maker (User C) is then prompted to request decision options from the autonomous decision support algorithm 20. These decision options could be in the form of a list or a visualisation. These options are based on the plan 21, the pre-conditions 26 and constraints 27 from the domain description 22, and the additional 'intelligence' insight information in the intelligence tag layer 12. This allows User C to make a timely and informed decision, which takes the complexities of the situation into account. This reduces the likelihood of an incorrect decision being taken due to a lack of human situational awareness, because the complexity of the possible options is handled by the system. This would mean that a decision to take a particular action would only be presented if it does not conflict with the objectives of the plan—for example to close communications from a particular IP address may not be an appropriate action if it conflicts with the objective to maintain a service on that IP address. A person making this decision would not be able to fully understand the implications of an action, taking into account all of the important factors, especially as this is scaled up. This system takes these factors into account to allow decision makers to be presented with options autonomously, based on the tasks they are trying to achieve.

For example four decision options may be presented to the User C:
 option one—prevent spread—close port #
 option two—protect data—close comms from IP
 option three—re-route all traffic from a specific IP address to a honeypot for monitoring an intelligence gathering
 option four—gather more sensor data If option one, two or three is selected as an action 23 then the objectives 24 and/or tasks 25 of the plan 21 may be updated to reflect this change. An action 23 may have an effect on the computer network being monitored by the sensors 3a,3b—for instance closing down a port will have an effect on the network and therefore the data being sensed. This feedback loop is represented by a dashed line 31 in FIG. 1.

The changed objectives 24 or tasks 25 of the plan provide a further input in the visualisation 5, so any or all of the views 42,43,50 may be updated with a description of the action 23 and/or the associated changes in the operational plan 21.

The decision support algorithm 20 employs a hierarchical test network (HTN) planning process involving the iterative subdivision of goals until a set of fully ground, orderable (for parallel and/or sequential performance) activities is found. A user (for instance User C) participates in this mixed-initiative planning process through selecting the methods to be applied by the planner—which particular goal-to-subgoal decomposition will be applied when forming that plan.

The decision support 20 thus presents User C with a set of options—goal decomposition—applicable to the current situation. This set of options is automatically derived from the current data set (the term "data set" including both the sensor data and any tag data which has been added by any of the users).

Simultaneously, the users add additional tag data to the original data set. As this data set is continuously augmented, the decision support 20 will automatically update its suggested options in response. As well as utilising the additional tag data to further refine the set of options available (taking advantage of user expert knowledge), tag data is used by the decision support 20 to provide prioritization suggestions for the available options.

For example, User B may highlight a particular item of sensor data as being of immediate concern, and the decision support 20 will thus prioritize options which directly address the state or cause of this item. As User C views each option output by the decision support 20, they can be presented with a visualization of the justification for highlighting it—including the tag data, the age of that data, the identity of the user who added the relevant tag data and any conflicting tag data (such as if User A has a different opinion) within the augmented data set.

Once User C selects an option, the current plan 21 is revised accordingly. If a goal within the plan corresponds to a primitive activity, then this can be performed (leading to revision of the sensor data set in the data layer 2 with post-execution sensory information). User C may also opt to wait—depending on the urgency of response—for further tag data to be provided in order to aid option generation and prioritization.

Although the invention has been described above with reference to one or more preferred embodiments, it will be appreciated that various changes or modifications may be made without departing from the scope of the invention as defined in the appended claims.

The invention claimed is:

1. A method of generating decision options, the method comprising operating a computer system to:
   receive and store sensor data from a plurality of sensors;
   present a visualisation of at least some of the sensor data to a first user;
   receive and store first tag data from the first user in response to the presentation of the visualisation to the first user;
   present a visualisation of at least some of the sensor data to a second user which is the same visualisation that is presented to the first user or a different visualisation;
   receive and store second tag data from the second user in response to the presentation of the visualisation to the second user;
   generate decision options with a computer implemented decision support algorithm in accordance with the first and second tag data, a stored operational plan, and at least some of the sensor data; and
   output the decision options generated by the decision support algorithm.

2. The method of claim 1 wherein the decision options generated by the decision support algorithm are output to a decision maker who is the first or second user or a different person, and the method further comprises operating the computer system to:
   receive and store a selection of one of the decision options from the decision maker; and
   update the stored operational plan in accordance with the selection from the decision maker.

3. The method of claim 1 further comprising operating the computer system to:
   generate a tag visualisation view from of at least some of the sensor data, at least some of the first tag data and at least some of the second tag data;
   present the tag visualisation view to a tag visualiser who is the first or second user, the decision maker, or a different person; and
   receive third tag data from the tag visualiser in response to the presentation of the tag visualisation view,
   wherein the decision options are generated by the decision support algorithm in accordance with the sensor data, the operational plan, and the first, second and third tag data.

4. The method of claim 1 wherein the visualisations are presented to the first and second users at different times.

5. The method of claim 1 wherein the different visualisations presented to a first human user and the second human user are based on different subsets of the sensor data.

6. A computer system comprising:
   a sensor data store for storing sensor data from a plurality of sensors;
   a visualisation server for generating one or more visualisations of at least some of the sensor data;
   one or more output devices for displaying the visualisation(s) to a first and second user;
   one or more input devices for receiving tag data from the first and second users;
   a tag data store, which is the same store as the sensor data store or a different store, for storing the tag data from the first and second users;
   a decision support server programmed to run a decision support algorithm which generates decision options in accordance with the first and second tag data, a stored operational plan, and at least some of the sensor data; and
   an output device, which is the one or more output devices for displaying the visualisation(s) to a first and second user or a different output device, for outputting the decision options generated by the decision support algorithm.

* * * * *